United States Patent
Mase et al.

(10) Patent No.: US 12,292,233 B2
(45) Date of Patent: May 6, 2025

(54) FREEZING TRANSPORT CONTAINER, AND CRYOGENIC LIQUEFIED GAS ABSORBER CASE

(71) Applicant: TAIYO NIPPON SANSO CORPORATION, Tokyo (JP)

(72) Inventors: Akira Mase, Tokyo (JP); Shigehiro Yoshimura, Tokyo (JP)

(73) Assignee: TAIYO NIPPON SANSO CORPORATION, Tokyo (JP)

( * ) Notice: Subject to any disclaimer, the term of this patent is extended or adjusted under 35 U.S.C. 154(b) by 26 days.

(21) Appl. No.: 17/614,809

(22) PCT Filed: Jun. 12, 2020

(86) PCT No.: PCT/JP2020/023187
§ 371 (c)(1),
(2) Date: Nov. 29, 2021

(87) PCT Pub. No.: WO2020/251010
PCT Pub. Date: Dec. 17, 2020

(65) Prior Publication Data
US 2022/0228789 A1    Jul. 21, 2022

(30) Foreign Application Priority Data
Jun. 14, 2019   (JP) ................. 2019-110855

(51) Int. Cl.
*F25D 3/10*     (2006.01)

(52) U.S. Cl.
CPC ................. *F25D 3/105* (2013.01)

(58) Field of Classification Search
CPC ..... F25D 3/105; A01N 1/0257; A01N 1/0273; A01N 1/0263
See application file for complete search history.

(56) References Cited

U.S. PATENT DOCUMENTS

| | | | |
|---|---|---|---|
| 2012/0325826 A1 | 12/2012 | McCormick | |
| 2014/0158683 A1* | 6/2014 | Horiuchi et al. | F17C 3/085 220/23.83 |

(Continued)

FOREIGN PATENT DOCUMENTS

| | | |
|---|---|---|
| CN | 205352821 | 6/2016 |
| GB | 2 377 985 A | 1/2003 |

(Continued)

OTHER PUBLICATIONS

JP 2017165487 A Translation (Year: 2017).*

(Continued)

*Primary Examiner* — Elizabeth J Martin
*Assistant Examiner* — Dario Antonio Deleon
(74) *Attorney, Agent, or Firm* — Nixon & Vanderhye P.C.

(57) ABSTRACT

A freezing transport container allows easy removal and installation of a cryogenic liquefied gas absorber which is impregnated with cryogenic liquefied gas. A cryogenic liquefied gas absorber case can be installed in the freezing transport container. The freezing transport container includes an insulated main body, a top opening, and a bottom tubular shape. A lid is installed at the opening of the main body. A cryogenic liquefied gas absorber case is installed removably at the bottom of the main body, and the cryogenic liquefied gas absorber case includes a case portion which has a bottomed tubular shape and a cryogenic liquefied gas absorber which is installed replaceably inside the case portion.

12 Claims, 8 Drawing Sheets

(56) References Cited

U.S. PATENT DOCUMENTS

2018/0292051 A1* 10/2018 Ally .................... A01N 1/0257
2019/0150427 A1* 5/2019 McCormick ......... A01N 1/0257

FOREIGN PATENT DOCUMENTS

| JP | 2008-285181 | 11/2008 | |
| JP | 4881046 | 2/2012 | |
| JP | 4881046 B2 * | 2/2012 | ............ B65D 81/38 |
| JP | 2017029388 A * | 2/2017 | ............... A61J 3/00 |
| JP | 2017-165487 | 9/2017 | |
| JP | 2017165487 A * | 9/2017 | ............ B65D 81/38 |
| WO | WO 02053967 A1 * | 7/2002 | ............ F25D 3/105 |
| WO | 2014/027412 | 2/2014 | |
| WO | WO 2017083164 A1 * | 5/2017 | ........... A01N 1/0257 |

OTHER PUBLICATIONS

JP 4881046 B2 Translation (Year: 2012).*
WO 2017083164 A1 (Year: 2017).*
WO 02053967 A1 Copy (Year: 2002).*
JP 2017029388 A Translation (Year: 2017).*
International Search Report for PCT/JP2020/023187, mailed Jul. 7, 2020, 4 pages.
Extended European Search Report mailed Jun. 7, 2023 in European Application No. 20822402.2, 8 pages.

* cited by examiner

FREEZING TRANSPORT CONTAINER, AND CRYOGENIC LIQUEFIED GAS ABSORBER CASE

This application is the U.S. national phase of International Application No. PCT/JP2020/023187 filed 12 Jun. 2020, which designated the U.S. and claims priority to JP Patent Application No. 2019-110855 filed 14 Jun. 2019, the entire contents of each of which are hereby incorporated by reference.

TECHNICAL FIELD

The present invention relates to a freezing transport container which stores and transports biological samples in medical and biotechnology fields and the like such as cells in a frozen state, and a cryogenic liquefied gas absorber case which is installed in the freezing transport container and used to keep the inside of the container at a low temperature.

BACKGROUND ART

A dry shipper with a vacuum heat-insulating structure as a means for transporting a biological sample in a frozen state is known in the art. Since an absorbent material for liquid nitrogen, which is a cryogenic liquefied gas, is arranged inside the dry shipper, and the liquid nitrogen is absorbed by the absorbent material, there is no risk of spilling the liquid nitrogen even if it falls during transportation.

For example, Patent Document 1 discloses a cryopreservation container using an impregnating material impregnated with cryogenic liquefied gas such as liquid nitrogen.

The cryopreservation container of Patent Document 1 includes a heat-insulating container having a small-diameter sample inlet/outlet and a cylindrical storage area which has a diameter larger than the diameter of the sample inlet/outlet, and is formed below the sample inlet/outlet, and the impregnating material is arranged on the bottom and inner peripheral walls of the heat-insulating container.

PRIOR ART DOCUMENTS

Patent Literature

Patent Document 1: Japanese Patent No. 4881046

SUMMARY OF INVENTION

Problem to be Solved by the Invention

In order to make the cryopreservation container disclosed in Patent Document 1 less susceptible to the influence of the outside air temperature, the sample inlet/outlet has a smaller diameter than that of the storage area for storing the sample. Therefore, it is not possible to take in a large sample such as a bag shape.

Further, there is a problem in that since the impregnating material is arranged on the peripheral wall of the sample storage area, the inner diameter of the sample storage area becomes small, and an elongated sample such as a vial can be stored, but a large sample having a bag shape or the like cannot be stored.

Further, the impregnating material used in the cryopreservation container disclosed in Patent Document 1 is fixed in a heat-insulating container and cannot be removed. However, it is conceivable that the impregnating material gradually deteriorates reducing the absorption amount of liquid nitrogen or becoming contaminated, and a replaceable structure is required.

The present invention has been made to solve such problems, and an object of the present invention is to provide a freezing transport container which can store large samples such as bag shapes and allows easy removal and installation of a cryogenic liquefied gas absorber which is impregnated with cryogenic liquefied gas such as liquid nitrogen, and a cryogenic liquefied gas absorber case which can be installed in the freezing transport container.

Means for Solving the Problem

In order to solve the problems, the present invention provides the following freezing transport container and cryogenic liquefied gas absorber case.

(1) A freezing transport container including a main body which has a heat-insulating structure, an opening at the top, and a bottomed tubular shape, and a lid which is installed at the opening of the main body so as to open and close the opening of the main body, wherein the main body has the same diameter at the opening at the top and the bottom, the freezing transport container further includes a cryogenic liquefied gas absorber case which is installed removably at the bottom of the main body, and the cryogenic liquefied gas absorber case includes a case portion which has a bottomed tubular shape and a cryogenic liquefied gas absorber which is installed replaceably inside the case portion.

(2) The freezing transport container according to (1), wherein the case portion is formed by a heat conductor, has a side wall portion arranged along the inner peripheral wall of the main body, and an inner space of the side wall portion functions as a sample storage portion, and a height of the side wall portion is higher than a height of the cryogenic liquefied gas absorber.

(3) The freezing transport container according to (1) or (2), wherein the main body having a heat-insulating structure has a vacuum double structure formed by stainless steel, and the case portion is made of aluminum or copper.

(4) The freezing transport container according to any one of (1) to (3), wherein the case portion includes a fixing plate, and the fixing plate and the cryogenic liquefied gas absorber are provided with a sample insertion hole which is configured to be received with a sample to be stored.

(5) A cryogenic liquefied gas absorber case which is configured to be installed removably on the bottom of a freezing transport container including a main body which has a heat-insulating structure, an opening at the top, a bottomed tubular shape, and the same diameter at the opening at the top and the bottom, and a lid which is installed into the opening in the main body so as to open and close the opening of the main body, wherein the cryogenic liquefied gas absorber case includes a case portion which has a bottomed tubular shape, and a cryogenic liquefied gas absorber which is installed replaceably inside the case portion.

(6) A cryogenic liquefied gas absorber case according to (5), wherein the case portion is formed by a heat conductor and has a side wall portion arranged along an inner peripheral wall of the main body, an inner space of the side wall portion functions as a sample storage portion, and a height of the side wall portion is higher than a height of the cryogenic liquefied gas absorber.

(7) The cryogenic liquefied gas absorber case according to (5) or (7), wherein the case portion is formed by aluminum or copper.

The freezing transport container according to the present invention includes a main body having a heat-insulating structure, an opening at the top, and a bottomed tubular shape, and a lid which is installed at the opening of the main body so as to open and close the opening of the main body, wherein the main body has the same diameter at the opening at the top and the bottom, the freezing transport container further includes a cryogenic liquefied gas absorber case which is installed removably at the bottom of the main body, and the cryogenic liquefied gas absorber case includes a case portion which has a bottomed tubular shape and a cryogenic liquefied gas absorber which is installed replaceably inside the case portion.

Since the cryogenic liquefied gas absorber case can be taken out and the cryogenic liquefied gas absorber can be easily replaced, the cryogenic liquefied gas absorber can be recovered against deterioration and contamination.

In addition, since the main body has the same diameter at the top and the bottom, the inner space is wide and a large sample such as a bag can be stored, which makes it possible to transport a large sample, which was difficult in the past.

Effects of the Invention

DETAILED DESCRIPTION OF THE PREFERRED EMBODIMENTS

A freezing transport container according to the present embodiment will be described with reference to FIGS. 1 to 6. In the following description, a case in which a main body of the freezing transport container is cylindrical will be taken as an example, and liquid nitrogen will be taken as an example of a cryogenic liquefied gas. However, the present invention is not limited thereto.

As shown in FIGS. 1 to 6, a freezing transport container 1 according to the present embodiment is for transporting a sample while maintaining it in a frozen state. The freezing transport container 1 according to the present embodiment includes a main body 3 having a heat-insulating structure, an opening 3a at the top, and a bottomed cylindrical shape; a lid 5 which can open and close the opening 3a of the main body 3; and a liquid nitrogen absorber case 7 which is removably installed at the bottom of the main body 3.

Below, each configuration will be explained in detail.

<Sample>

A sample is a biological sample mainly contained in a vial, a blood bag, and the like. The volume of the vial, the bag, and the like, is, for example, 25 ml, 50 ml, and 100 ml. The freezing transport container 1 contains 10 or about 10 of the vials, the bags, and the like.

<Main Body>

Figure 1:
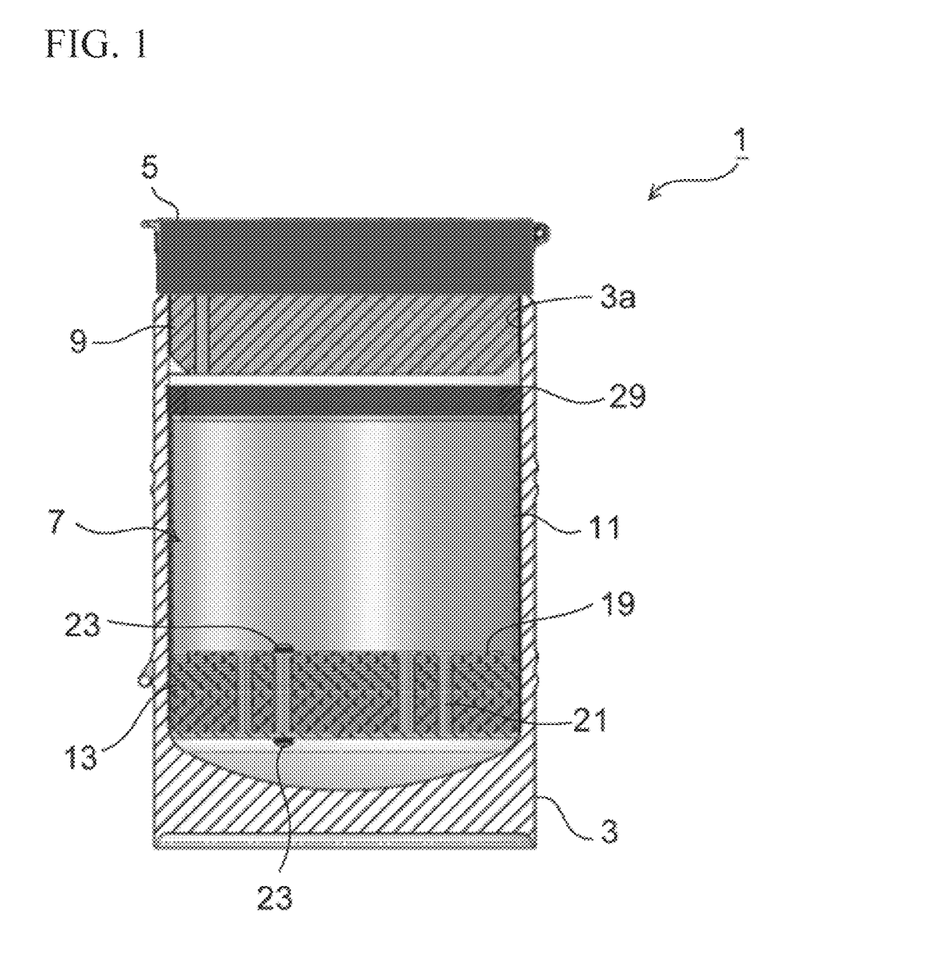
FIG. 1 is a cross-sectional view showing a freezing transport container according to an embodiment of the present invention.
Figure 2:
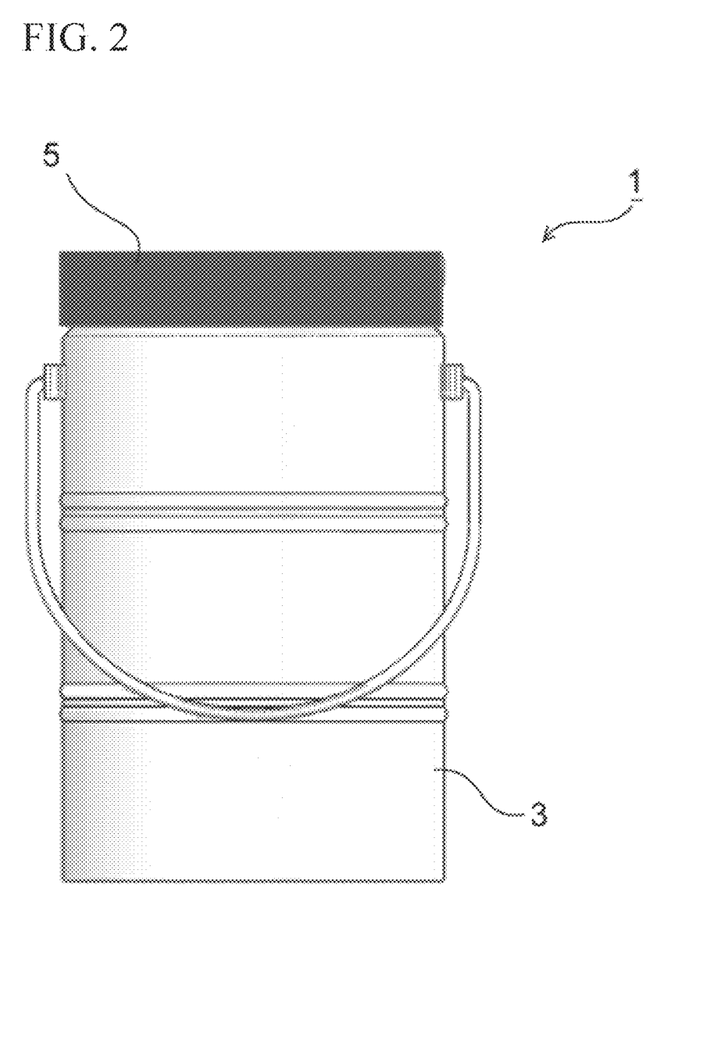
FIG. 2 is a diagram showing the appearance of a freezing transport container according to an embodiment of the present invention.
Figure 3:
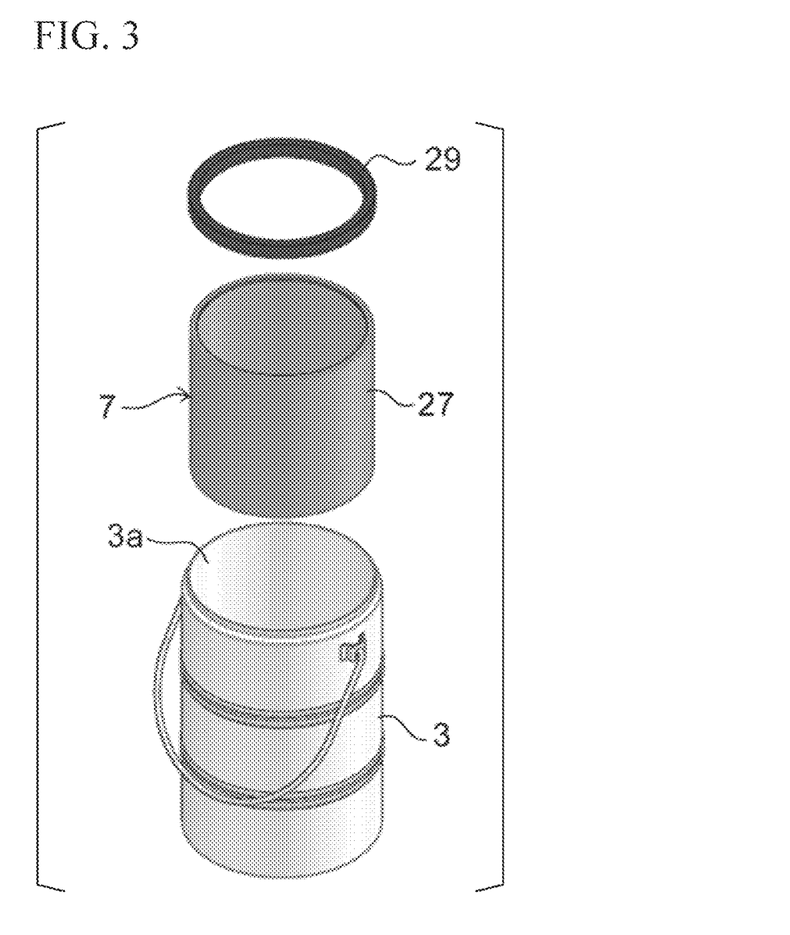
FIG. 3 is a perspective view showing a liquid nitrogen absorber case and a case fixture which are taken out from the main body of a freezing transport container.

The main body 3 has a heat-insulating structure, the opening 3a at the upper end, and a bottomed cylindrical shape as shown in FIGS. 1 to 3. The diameter of the opening 3a at the upper end and the diameter of the bottom of the main body 3 are the same. The main body 3 preferably has a vacuum double structure made of stainless steel.

An example of the external dimensions of the main body 3 is as follows.

External dimensions: φ200×H 300 mm

Opening and bottom: φ189 mm

<Lid>

The lid 5 is attached on the opening 3a of the main body 3 so as to be openable and closable. Further, as shown in FIG. 1, the lid body 5 has a cylindrical portion 9 having the same diameter as that of the opening 3a. The cylindrical portion 9 is inserted into the opening 3a of the main body 3. The cylindrical portion 9 is formed by, for example, a heat-insulating material, such as polyurethane foam and polystyrene foam to prevent heat from entering through the opening 3a.

<Liquid Nitrogen Absorber Case>

Figure 4:
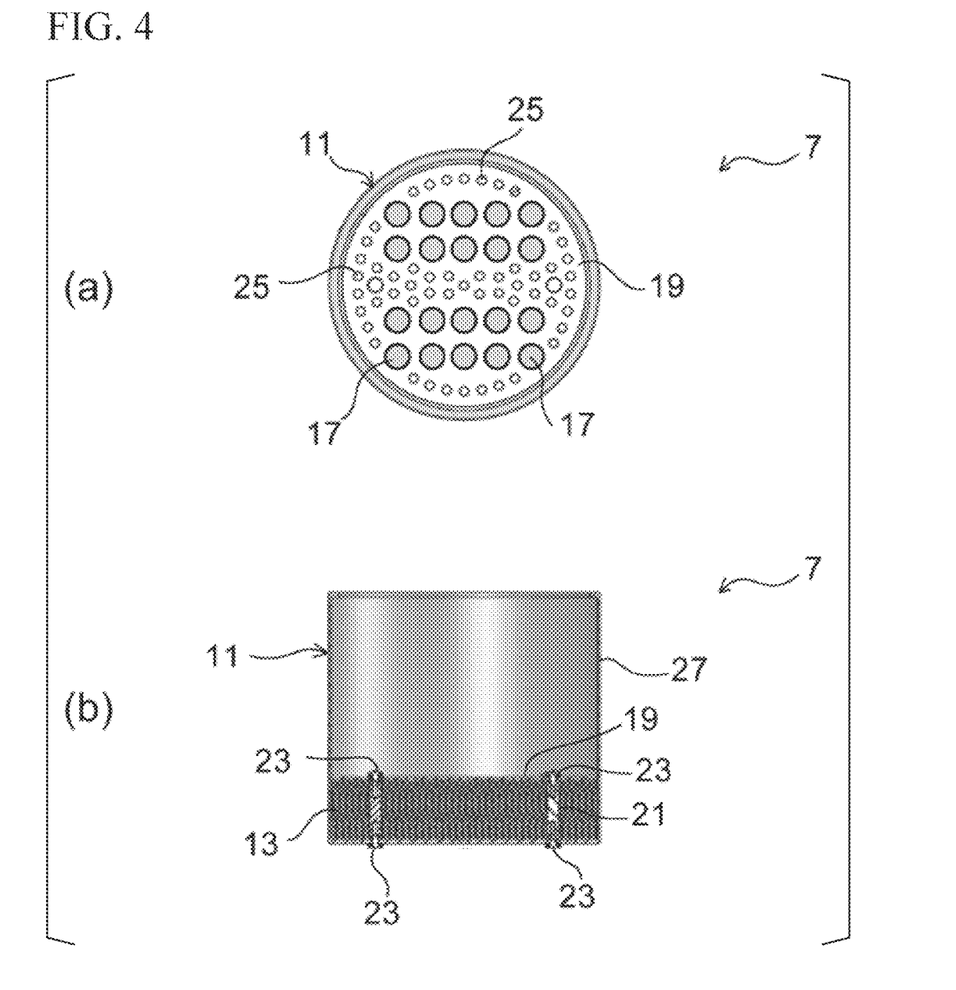
FIG. 4 is a plan view (a) and a cross-sectional view (b) showing a liquid nitrogen absorber case disposed in a freezing transport container according to the embodiment of the present invention.

As shown in FIG. 4, the liquid nitrogen absorber case 7 includes a bottomed cylindrical case portion 11 and a liquid nitrogen absorber 13 replaceably installed inside the case portion 11. The liquid nitrogen absorber case 7 is removably installed at the bottom of the main body 3.

Figure 5:
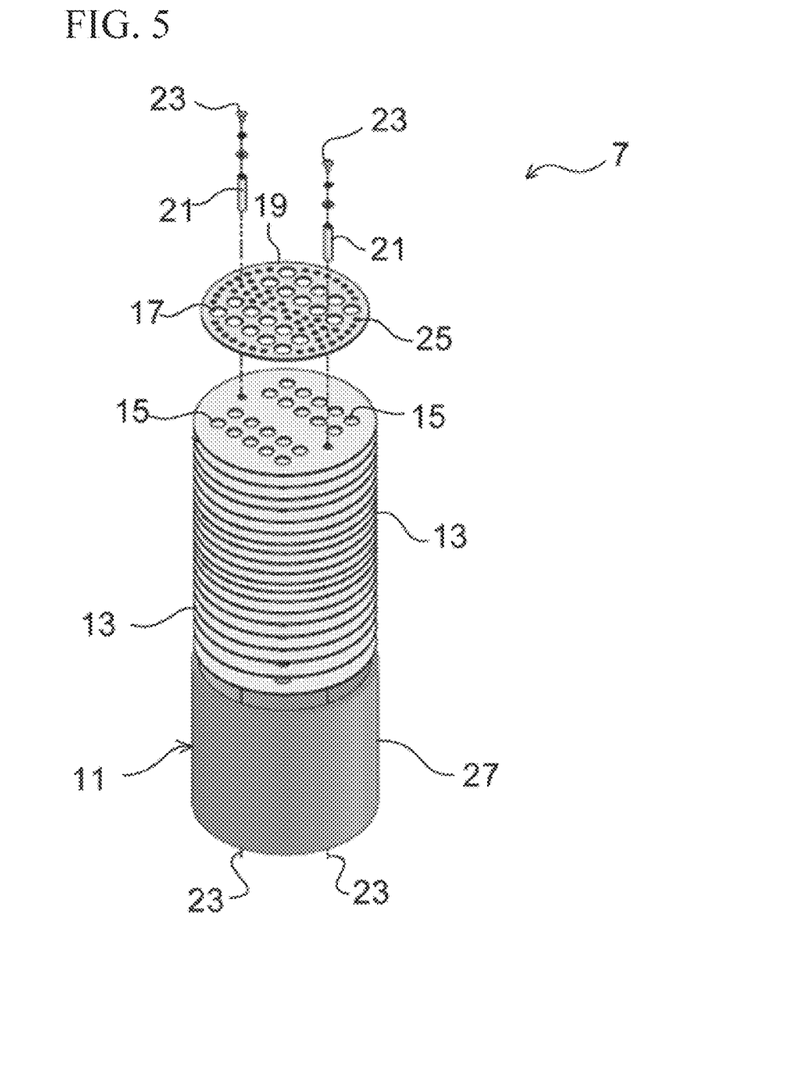
FIG. 5 is an explanatory diagram showing a method for installing a liquid nitrogen absorbent material in a liquid nitrogen absorber case.

The liquid nitrogen absorber 13 is formed of a plurality of circular sheets. As shown in FIGS. 4 and 5, the circular sheets are arranged so as to be stacked on the bottom of the case portion 11.

The liquid nitrogen absorber 13 is, for example, made of polypropylene, and has a diameter of φ180 mm, and a thickness of 50 mm when the plurality of circular sheets are stacked.

The liquid nitrogen absorber 13 is provided with a plurality of holes 15 in order to increase the speed at which liquid nitrogen is immersed therein (see FIG. 5). Further, the plurality of holes 15 can be directly inserted with a vial-shaped sample, and also function as a sample insertion hole.

Figure 6:
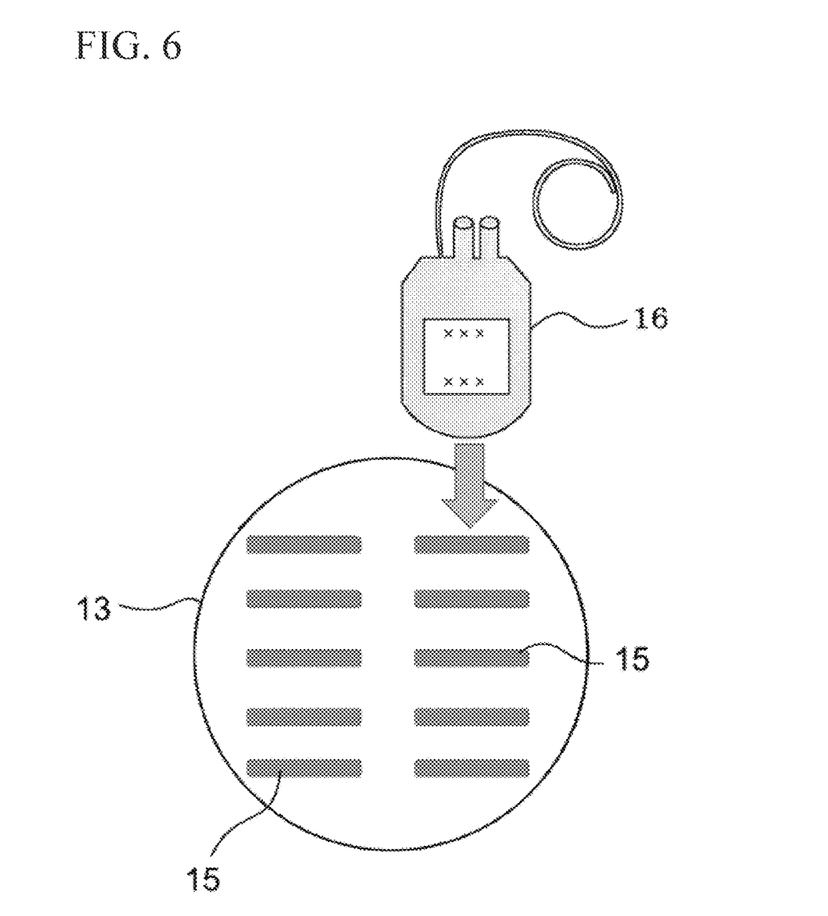
FIG. 6 is an explanatory diagram showing sample insertion holes according to another embodiment which are provided in a liquid nitrogen absorber installed in a freezing transport container of the present invention.

The shape of the hole 15 is not limited to a circular shape when the sample or the like is a vial, and may be, for example, a rectangular shape into which a bag-shaped sample 16 is inserted, as shown in FIG. 6.

When the hole 15 provided in the liquid nitrogen absorber 13 functions as a sample insertion hole, the liquid nitrogen absorber case 7 is preferably provided with a fixing plate 19 described later and shown in FIGS. 4 and 5. The fixing plate 19 is provided with an opening 17 having the same shape as that of the hole 15 provided in the liquid nitrogen absorber 13 at a position corresponding to the hole 15 provided in the liquid nitrogen absorber 13.

The fixing plate 19 is placed on the upper surface of the liquid nitrogen absorber 13. The fixing plate 19 is fixed to the case portion 11 by a fixing screw 23 and a spacer 21 provided so as to penetrate the stacked liquid nitrogen absorber 13 in the thickness direction. As a result, the liquid nitrogen absorber 13 formed by stacking a plurality of sheets is fixed inside the case portion 11. A method for fixing the liquid nitrogen absorber 13 using the spacer 21 and the fixing plate 19 will be described in more detail as follows.

The spacer 21 is a thin cylindrical metal fitting, and is threaded inside. A screw hole corresponding to the spacer 21 is formed at the bottom of the case portion 11. First, the fixing screw 23 is screwed into the spacer 21 from the lower surface side of the bottom of the case portion 11. As a result, the spacer 21 is erected on the bottom of the case portion 11. Next, the liquid nitrogen absorber 13 made of the plurality of sheets is placed in the case portion 11. Since the liquid nitrogen absorber 13 has a spacer insertion hole formed in a portion corresponding to the spacer 21, the liquid nitrogen absorber 13 is placed so that the spacer is inserted into the spacer insertion hole. After placing, the fixing plate 19 is arranged on the liquid nitrogen absorber 13, and the fixing screw 23 is screwed into the spacer 21 from the upper surface side of the fixing plate 19. Thereby, the liquid nitrogen absorber 13 can be attached into the case portion 11 by the spacer 21 and the fixing plate 19. By disposing the fixing plate 19, the liquid nitrogen absorber 13 is sandwiched between the bottom of the case portion 11 and the fixing plate 19 and does not fall off from the case portion 11.

When replacing the liquid nitrogen absorber 13, the liquid nitrogen absorber case 7 may be taken out from the main body 3 and the fixing plate 19 may be removed.

In addition to the insertion holes for the fixing screw 23, the fixing plate 19 is provided with a large number of passage holes 25 through which liquid nitrogen passes when the liquid nitrogen absorber 13 is impregnated with the liquid nitrogen.

Further, as described above, when the hole 15 provided in the liquid nitrogen absorber 13 functions as a sample insertion hole, the fixing plate 19 is provided with an opening 17. The opening 17 is provided at a position corresponding to the hole 15 provided in the liquid nitrogen absorber 13. For example, a sample such as a vial can be inserted into the opening 17.

The fixing plate 19 is formed by a metal heat conductor having high thermal conductivity such as aluminum, and copper, similar to the case portion 11 described later.

As shown in FIG. 4, the case portion 11 has a bottom portion and a side wall portion 27 provided upright from the periphery of the bottom portion. The side wall portion 27 is preferably arranged so that the outer peripheral surface thereof is in contact with the inner peripheral wall of the main body 3. That is, it is preferable that there be no space between the inner peripheral wall of the main body 3 and the side wall portion 27 of the case portion 11. As a result, a wide sample storage space can be secured. Furthermore, since there is no space, for example, an air layer, the heat-insulation efficiency can be improved.

The case portion 11 having the side wall portion 27 and the bottom portion is formed of a heat conductor, for example, metal having high thermal conductivity, such as aluminum and copper. By using a metal having high thermal conductivity, the cold heat of liquid nitrogen can be transferred to the upper part of the container faster and cool the upper part of the container. When the main body 3 is made of stainless steel, the case portion 11 is more preferably made of aluminum, which is less likely to rust.

An example of the dimensions of the case portion 11 is $\varphi 183$ mm×H 200 mm. The thickness of the case portion is 0.5 mm, and the inner diameter of the side wall portion 27 is $\varphi 182$ mm.

Although the description above illustrates the case in which the bottom of the case portion 11 is circular, the shape is not limited to a circular shape, and a shape such as a quadrangle or a polygon can be selected according to the application and the shape of the main body 3.

The case portion 11 has a function of transmitting the cold heat of the liquid nitrogen absorber 13 and effectively cooling the sample contained therein. When the case portion 11 having such functions comes into contact with the cylindrical portion 9 made of the heat-insulating material in the lid 5, the heat of the heat-insulating material itself is transferred to the inside of the container. Therefore, it is preferable that the case portion 11 and the cylindrical portion 9 not come into contact with each other, and it is preferable to set a gap of 2 to 3 mm between them.

When the side wall portion 27 of the case portion 11 has a height such that the upper end thereof is the same as the upper end of the inner wall surface of the main body 3, the cold heat of liquid nitrogen can be efficiently transmitted to the upper portion of the main body 3. Therefore, the inside of the main body 3 can be kept at a lower temperature.

On the other hand, as described above, the amount of evaporation loss of liquid nitrogen increases because the heat from the opening 3a is easily transferred to the inside of the container.

Therefore, it is preferable that the height of the side wall portion of the case portion 11 satisfy the following relationship.

(Distance from the upper end of the liquid nitrogen absorber 13 to the bottom of the cylindrical portion 9 of lid 5):(Height of the side wall portion 27) is preferably 100:0 to 95, and more preferably 100:70 to 90.

Figure 7:
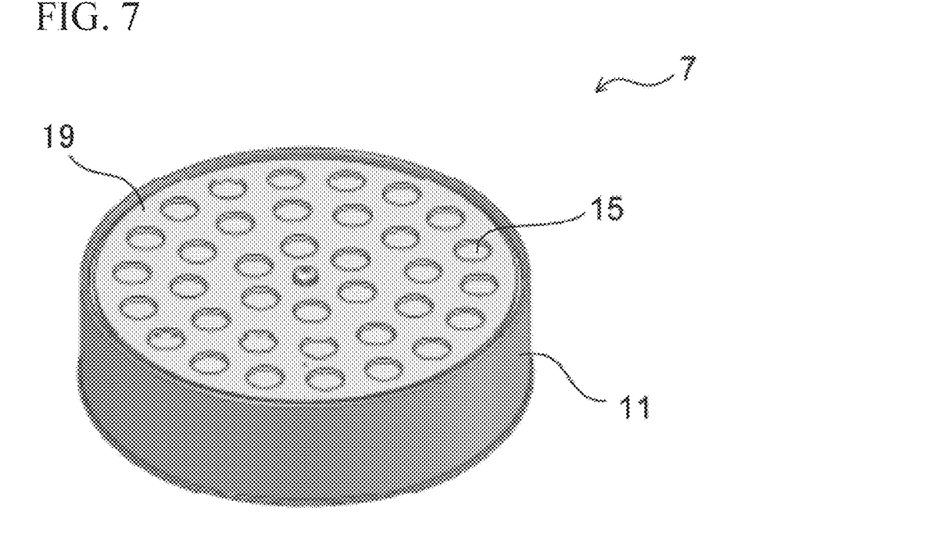
FIG. 7 is an explanatory diagram of a liquid nitrogen absorber case according to another embodiment which is provided in a freezing transport container of the present invention.

When (Distance from the upper end of the liquid nitrogen absorber 13 to the bottom of the cylindrical portion 9 of lid 5):(Height of the side wall portion 27) is 100:0, as shown in FIG. 7, the height of the side wall portion 27 of the case portion 11 is the same as the height of the liquid nitrogen absorber 13. When the height of the storage portion in the main body 3 is low, even if the height of the side wall portion 27 of the case portion 11 is the same as the height of the liquid nitrogen absorber 13, the storage space (holes 15 provided in the liquid nitrogen absorber 13) is sufficiently cooled by vaporized nitrogen. When the sample is inserted into the hole 15 of the liquid nitrogen absorber 13, the height of the side wall portion 27 of the case portion 11 may be the same as the height of the liquid nitrogen absorber 13.

In order to secure a wide space, it is preferable that the outer diameter of the side wall portion 27 of the case portion 11 be substantially the same as the inner diameter of the main body 3.

Further, when it is desired to rapidly cool the inside of the freezing transport container 1 or lower the temperature, fins may be provided on the inner wall of the side wall portion 27 in order to improve the heat-transfer performance.

The liquid nitrogen absorber case 7 is installed removably in the main body 3, and it is preferable that the liquid nitrogen absorber case 7 can be taken out easily. For example, it is preferable to use an annular case fixture 29 which is detachably attached in the vicinity of the opening 3a of the main body 3 (see FIGS. 1 and 3).

The outer diameter of the case fixture 29 is preferably slightly larger than the inner diameter of the opening 3a of the main body 3. Further, the case fixture 29 is preferably formed of a heat-insulating and flexible member such as polyurethane foam and polystyrene foam. As shown in FIG. 1, the case fixture 29 is attached in the vicinity of the opening 3a of the main body 3 in a state in which the liquid nitrogen absorber case 7 is arranged inside the main body 3.

Since the outer diameter of the case fixture 29 is slightly larger than the inner diameter of the main body 3, the case fixture 29 is detachably attached to the main body 3 in a compressed state. In this way, the case fixture 29 is press-fitted into the main body 3 and is arranged in close contact with the inner wall of the main body 3 at the upper part of the liquid nitrogen absorber case 7. Accordingly, even if the freezing transport container 1 is tilted, the liquid nitrogen absorber case 7 will not come out.

On the other hand, when the liquid nitrogen absorber case 7 is taken out in order to exchange the liquid nitrogen absorber 13 or the like, the case fixture 29 may be slightly bent and removed.

As described above, in the freezing transport container 1 of the present embodiment, the liquid nitrogen absorber case 7 can be taken out and the liquid nitrogen absorber 13 can be easily replaced. Therefore, if the liquid nitrogen absorber 13 is deteriorated or contaminated, it can be replaced.

When the height of the side wall portion 27 of the case portion 11 is higher than the height of the liquid nitrogen absorber 13, since the side wall portion 27 is along the inner wall of the main body 3, and the liquid nitrogen absorber 13 is arranged only at the bottom of the portion 11, the internal space is wide and a large sample such as a bag can be accommodated, which makes it possible to transport a large sample, which has been difficult in the past.

For example, a 50 ml bag-shaped sample requires a space of 95 mm (length)×85 mm (width)×10 mm (thickness). The diameter of the opening of a part of the conventional general dry shipper is narrower than the outer diameter. For example, the opening is designed to have a diameter of 50 mm to 70 mm. Therefore, a bag-shaped sample cannot be stored in a dry shipper having such dimensions. Alternatively, in order to store the bag-shaped sample in a dry shipper of which the opening diameter is smaller than the outer diameter, a dry shipper having a larger outer diameter must be used. Therefore, there are inconveniences such as an increase in the amount of liquid nitrogen used.

On the other hand, in the present embodiment, since the diameter of the opening and the diameter of the bottom of the main body 3 are the same, the opening 3a is φ189 mm, and the inner diameter of the side wall portion 27 is φ182 mm, it is possible to store the samples in the mode shown in FIG. 6.

Further, when the height of the side wall portion 27 of the case portion 11 is larger than the height of the liquid nitrogen absorber 13, it is possible to maintain a low temperature without narrowing the content volume of the upper part of the container storage space in which the temperature does not easily drop due to the heat-transfer from the lid 5 and the influence of the outside air temperature.

Figure 8:
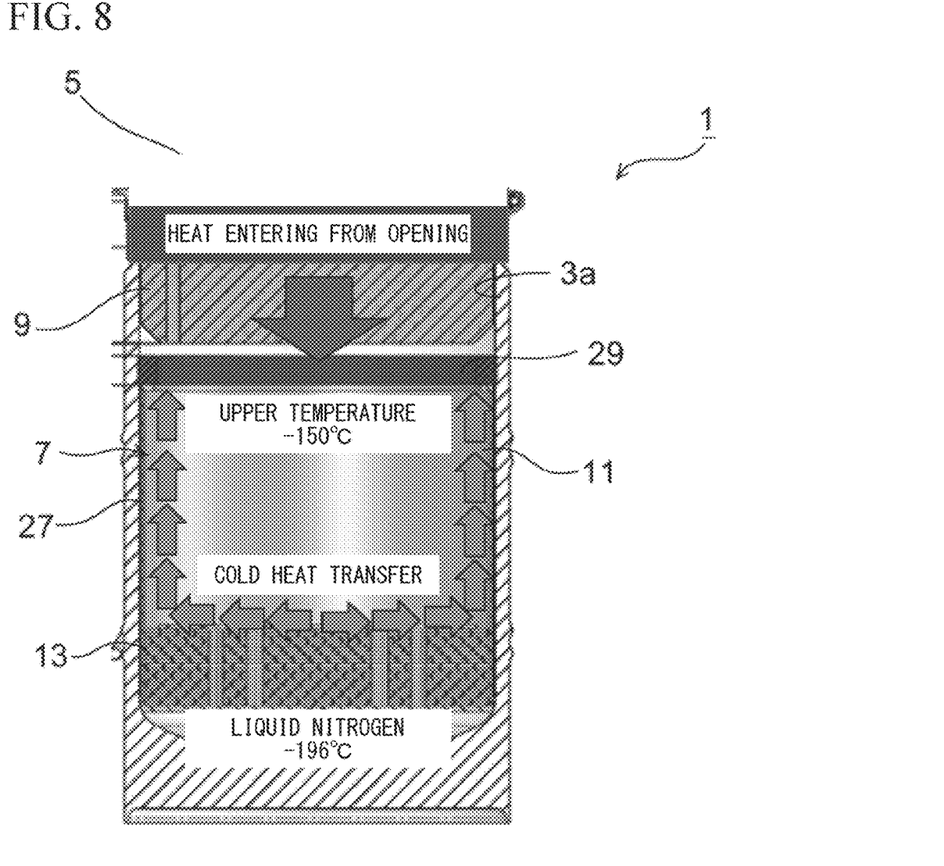
FIG. 8 is an explanatory diagram showing an internal heat-transfer state in a freezing transport container according to an embodiment of the present invention.

FIG. 8 shows the temperature inside the freezing transport container 1 of the present embodiment. A temperature of about −150° C. can be realized even in the upper part of the side wall portion 27.

That is, in a conventional freezing transport container, an impregnating material (liquid nitrogen absorber) is arranged on the bottom portion and the inner peripheral wall of the main body 3 which is a heat-insulating container. On the other hand, the freezing transport container 1 of the present embodiment includes the bottomed tubular case portion 11 having a side wall portion 27, and the liquid nitrogen absorber 13 is installed in the case portion 11. In particular, when the height of the side wall portion 27 is higher than the height of the liquid nitrogen absorber 13, the sample storage space is kept large in volume and kept at a low temperature.

Figure 9:
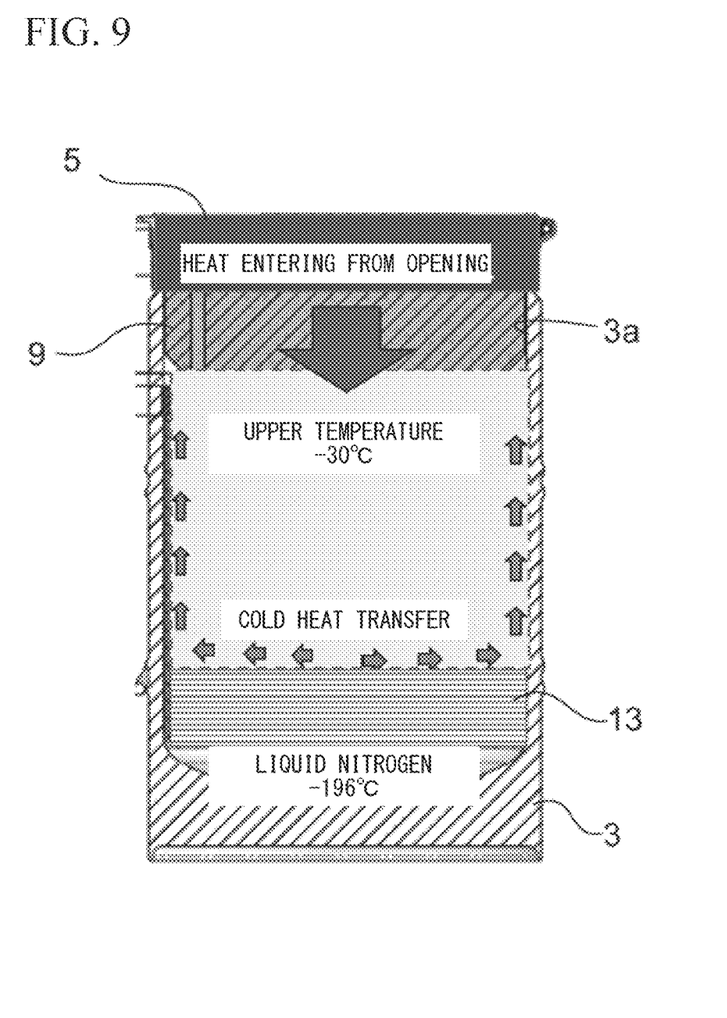
FIG. 9 is an explanatory diagram showing an internal heat-transfer state in a conventional freezing transport container which does not include the liquid nitrogen absorber case.

When the liquid nitrogen absorber 13 is installed on the bottom of the main body 3 having the same shape as that of the liquid nitrogen adsorber case 7 without providing the liquid nitrogen absorber case 7 in the main body 3, that is, in a conventional freezing transport container, the cold heat of the liquid nitrogen absorber 13 is transmitted to the inner wall of the main body 3 which is formed by stainless steel. However, since stainless steel has a low thermal conductivity, the upper part does not easily cool. Accordingly, as shown in FIG. 9, the temperature at the upper part is only about −30° C. From this result, a great effect can be expected when the case portion 11 includes the side wall portion 27 having a height larger than the height of the liquid nitrogen absorber 13.

Since the freezing transport container shown in FIG. 9 does not have the liquid nitrogen absorber case 7, the case fixture 29 is unnecessary, and the case fixture 29 is also not provided.

In the case of the freezing transport container 1 shown in FIG. 8, it took about 30 minutes for the temperature inside the main body 3 to reach −150° C. or lower after the liquid nitrogen absorber case 7 had been installed in the main body 3, and the temperature inside the main body 3 could be maintained at −150° C. or lower for about 300 minutes.

In the embodiment above, an example in which the main body 3 of the freezing transport container 1 has a cylindrical shape has been described. In this case, the liquid nitrogen absorber case 7 installed in the main body 3 also has a similar cylindrical shape.

However, the main body 3 of the freezing transport container 1 is not limited to a cylindrical shape, and may be, for example, a rectangular tubular shape. In this case, it is preferable that the liquid nitrogen absorber case 7 installed in the main body 3 also have the same rectangular tubular shape.

Further, in the embodiment above, liquid nitrogen is taken as an example as the cryogenic liquefied gas. However, the cryogenic liquefied gas used in the present invention is not limited to liquid nitrogen, and as long as a suitable absorbent material is used, a liquefied gas of an inert gas such as liquid helium and liquid argon can also be used.

EXPLANATION OF REFERENCE NUMERAL 1 freezing transport container
3 main body 3a opening
5 lid
7 liquid nitrogen absorber case
9 cylindrical portion
11 case portion
13 liquid nitrogen absorber
15 hole
16 bag-shaped sample
17 opening
19 fixing plate
21 spacer
23 fixing screw
25 passing hole
27 side wall portion
29 case fixture

The invention claimed is:

1. A freezing transport container including an insulated main body, an opening at the top, and a bottomed tubular shape, and a lid which is installed at the opening of the main body so as to open and close the opening of the main body,
wherein the main body has the same diameter at the opening at the top and the bottom,
the freezing transport container further includes a cryogenic liquefied gas absorber case which is installed removably at the bottom of the main body,
the cryogenic liquefied gas absorber case includes a case portion which has a bottomed tubular shape and a cryogenic liquefied gas absorber which is installed replaceably inside the case portion,
wherein the case portion is formed by a heat conductor and has a side wall portion arranged along an inner peripheral wall of the main body, and an inner space of the side wall portion is configured to function as a sample storage portion,
wherein a height of the side wall portion is higher than a height of the cryogenic liquefied gas absorber,
wherein the side wall portion is made of heat-conductive material with high thermal conductivity and configured to conduct heat from the absorber to a top edge of the wall portion forming an opening to the case portion, and
wherein a gap between the case portion and the lid is in a range between 2 to 3 mm, to thereby reduce heat transfer between the lid and the case portion,
wherein the liquid nitrogen absorber case further includes a fixing plate, at least one spacer, and at least two fixing screws,
wherein the cryogenic liquefied gas absorber is provided with holes in the thickness direction;
wherein the fixing plate is placed on the upper surface of the liquid nitrogen absorber, and provided with holes at positions corresponding to the holes in the cryogenic liquefied gas absorber;
wherein a bottom of the liquid nitrogen absorber case is provided with holes at positions correspond to the holes in the cryogenic liquefied gas absorber,
wherein the at least one spacer is threaded inside, and penetrates the hole of the cryogenic liquefied gas absorber; and
wherein the at least two fixing screws are screwed into the spacer from the upper end of the spacer via the fixing plate and the lower end of the spacer via the bottom of the cryogenic liquefied gas absorber case.

2. The freezing transport container according to claim 1, wherein the main body has a vacuum double structure formed by stainless steel, and the case portion is made of aluminum or copper.

3. The freezing transport container according to claim 1, wherein the case portion includes a fixing plate, and the fixing plate and the cryogenic liquefied gas absorber are provided with a sample insertion hole which is configured to be received with a sample to be stored.

4. The freezing transport container according to claim 1, wherein the case is removable from the bottom of the main body via the opening in the main body when the lid has been opened.

5. The freezing transport container according to claim 1, wherein the case portion is configured to transfer cold air from an inner surface of the side wall portion to the sample storage portion by way of convection.

6. The freezing transport container according to claim 1, wherein the sample storage portion is bounded by an upper surface of the cryogenic liquefied gas absorber and an inner surface of the side wall portion, and has a storage height extending from the upper surface of the cryogenic liquefied gas absorber to a distal end of the side wall portion.

7. The freezing transport container according to claim 1, wherein the height of the side wall portion is at least double a height of the cryogenic liquefied gas absorber.

8. A cryogenic liquefied gas absorber case which is configured to be installed removably on the bottom of a freezing transport container including an insulted main body, an opening at the top, a bottomed tubular shape, and the same diameter at the opening at the top and the bottom, and a lid which is installed into the opening in the main body so as to open and close the opening of the main body,
wherein the cryogenic liquefied gas absorber case includes a case portion which has a bottomed tubular shape, and a cryogenic liquefied gas absorber which is installed replaceably inside the case portion,
wherein the case portion is formed by a heat conductor and has a side wall portion arranged along an inner peripheral wall of the main body,
an inner space of the side wall portion is configured to function as a sample storage portion, and
a height of the side wall portion is higher than a height of the cryogenic liquefied gas absorber,
wherein the side wall portion is made of heat-conductive material with high thermal conductivity and configured to conduct heat from the absorber to a top edge of the wall portion forming an opening to the case portion, and
wherein the case portion is dimensioned so as to be spaced from the lid by a gap that ranges between 2 to 3 mm, to thereby reduce heat transfer between the lid and the case portion,
wherein the liquid nitrogen absorber case further includes a fixing plate, at least one spacer, and at least two fixing screws,
wherein the cryogenic liquefied gas absorber is provided with holes in the thickness direction;
wherein the fixing plate is placed on the upper surface of the liquid nitrogen absorber, and provided with holes at positions corresponding to the holes in the cryogenic liquefied gas absorber;
wherein a bottom of the liquid nitrogen absorber case is provided with holes at positions correspond to the holes in the cryogenic liquefied gas absorber,
wherein the at least one spacer is threaded inside, and penetrates the hole of the cryogenic liquefied gas absorber; and
wherein the at least two fixing screws are screwed into the spacer from the upper end of the spacer via the fixing plate and the lower end of the spacer via the bottom of the cryogenic liquefied gas absorber case.

9. The cryogenic liquefied gas absorber case according to claim 8, wherein the case portion is formed by aluminum or copper.

10. The cryogenic liquefied gas absorber case according to claim 8, wherein the case portion is configured to transfer cold air from an inner surface of the side wall portion to the sample storage portion by way of convection.

11. The cryogenic liquefied gas absorber case according to claim 8, wherein the sample storage portion is bounded by an upper surface of the cryogenic liquified gas absorber and an inner surface of the side wall portion, and has a storage height extending from the upper surface of the cryogenic liquified gas absorber to a distal end of the side wall portion.

12. The cryogenic liquefied gas absorber case according to claim 8, wherein the height of the side wall portion is at least double a height of the cryogenic liquified gas absorber.

* * * * *